United States Patent [19]
Nakazoe

[11] Patent Number: 5,371,693
[45] Date of Patent: Dec. 6, 1994

[54] COMPUTER WITH POWER SAVING FUNCTION

[75] Inventor: Masayo Nakazoe, Tokyo, Japan

[73] Assignee: Kabushiki Kaisha Toshiba, Kawasaki, Japan

[21] Appl. No.: 959,903

[22] Filed: Oct. 13, 1992

[30] Foreign Application Priority Data

Oct. 11, 1991 [JP] Japan .................................. 3-264079

[51] Int. Cl.⁵ .............................................. G06F 1/32
[52] U.S. Cl. .................................................... 364/707
[58] Field of Search ........................................ 364/707

[56] References Cited

U.S. PATENT DOCUMENTS 3,922,526  11/1975  Cochran ............................. 364/707
3,941,989   3/1976  McLaughlin et al. ............... 364/707
4,649,373   3/1987  Bland et el. ......................... 364/707
4,851,987   7/1989  Day ..................................... 364/707
4,980,836  12/1990  Carter et al. ........................ 364/483
5,083,266   1/1992  Watanabe ............................ 395/275
5,189,647   2/1993  Suzuki et al. ....................... 364/707

Primary Examiner—David H. Malzahn
Attorney, Agent, or Firm—Finnegan, Henderson, Farabow, Garrett & Dunner

[57] ABSTRACT

If there is neither a key input from a keyboard nor a command input from a CPU within a predetermined period of time, a keyboard controller generates an NMI request for sleep control. The CPU executes the NMI request in accordance with an NMI routine stored in a ROM. If the CPU is in an idle state, a sleep mode is set.

15 Claims, 3 Drawing Sheets

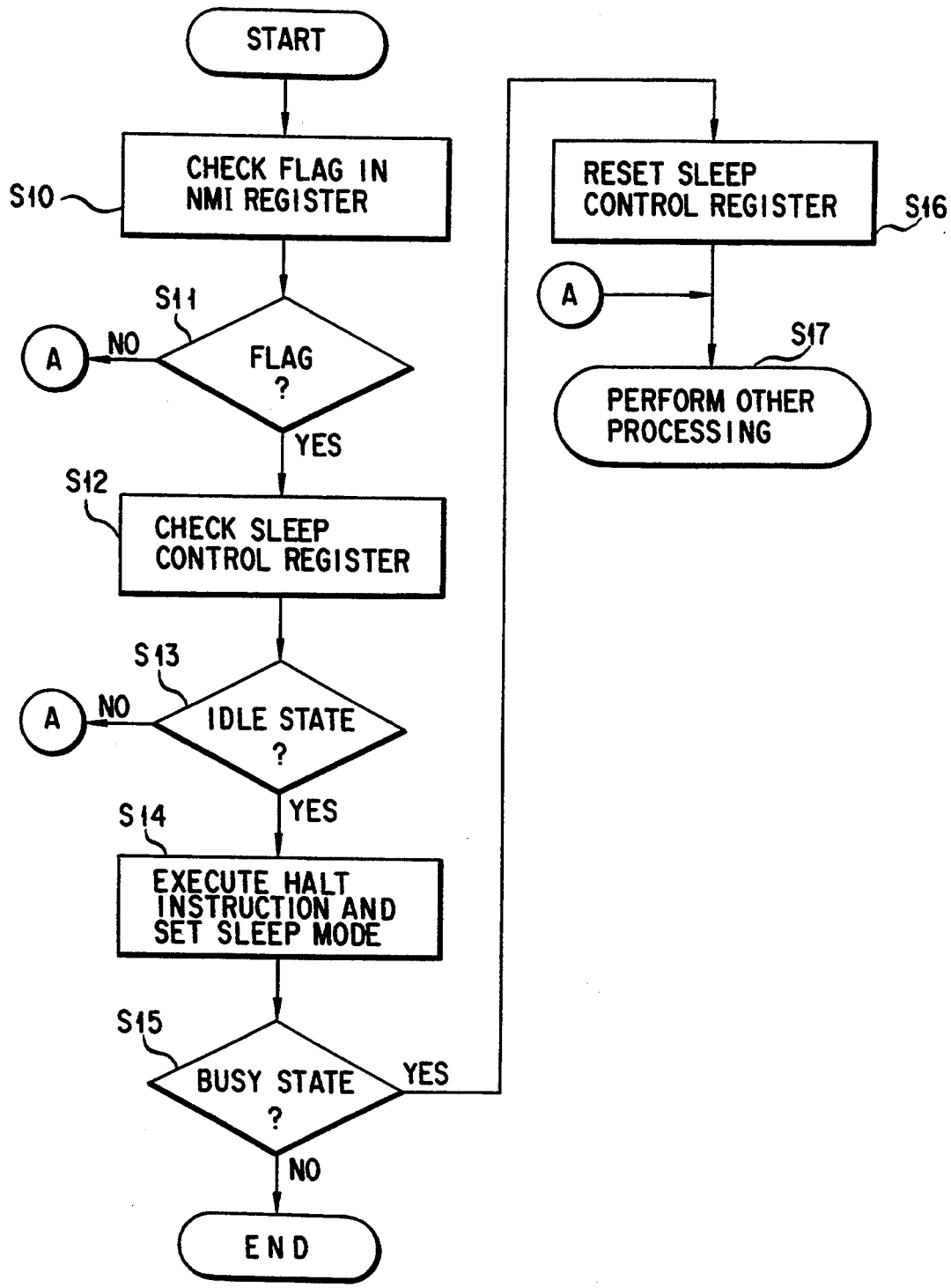
F I G. 3

COMPUTER WITH POWER SAVING FUNCTION

BACKGROUND OF THE INVENTION

1. Field of the Invention

The present invention relates to a computer system having a function of executing a sleep mode as a power saving mode.

2. Description of the Related Art

Of the conventional computer systems such as personal computers, some computers are designed such that a sleep mode (power saving mode) is set when no key input is made from the keyboard within a predetermined period of time while the CPU is in an idle state. In the sleep mode, the frequency of a clock supplied to the CPU is decreased to set the operating speed of the CPU in a low speed mode. With this operation, the overall power consumption of the system can be reduced.

The sleep mode is normally controlled by the BIOS (basic input/output system) of the system. The BIOS checks a key code input from the keyboard, and sets the sleep mode if no key code is present in the buffer. However, some application software uses the key code read function of the BIOS. In this case, the sleep mode cannot be executed.

In the conventional systems having the sleep mode, even if no key input is made from the keyboard during the execution of application software, the sleep mode cannot be executed sometimes.

SUMMARY OF THE INVENTION

It is an object of the present invention to provide a computer system which can reliably execute a sleep mode, regardless of the contents of application software which is being executed in the system, by generating an interrupt request for sleep control when a condition for the sleep mode is satisfied.

According to the present invention, there is provided a computer system which executes a sleep mode, comprising input control means for generating an interrupt request for sleep control when no input is made from an input unit within a predetermined period of time, and control means for setting the sleep mode if a CPU is in an idle state.

In the present invention, if no input is made from the input unit within the predetermined period of time, the input control means generates an interrupt request for sleep control. In response to the interrupt request, the control means discriminates whether the CPU is in an idles state. If the CPU is in an idle state, the control means sets the sleep mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a flow chart for explaining an operation of the embodiment.

DETAILED DESCRIPTION OF THE PREFERRED EMBODIMENTS

An embodiment of the present invention will be described below with reference to the accompanying drawings.

Figure 1:
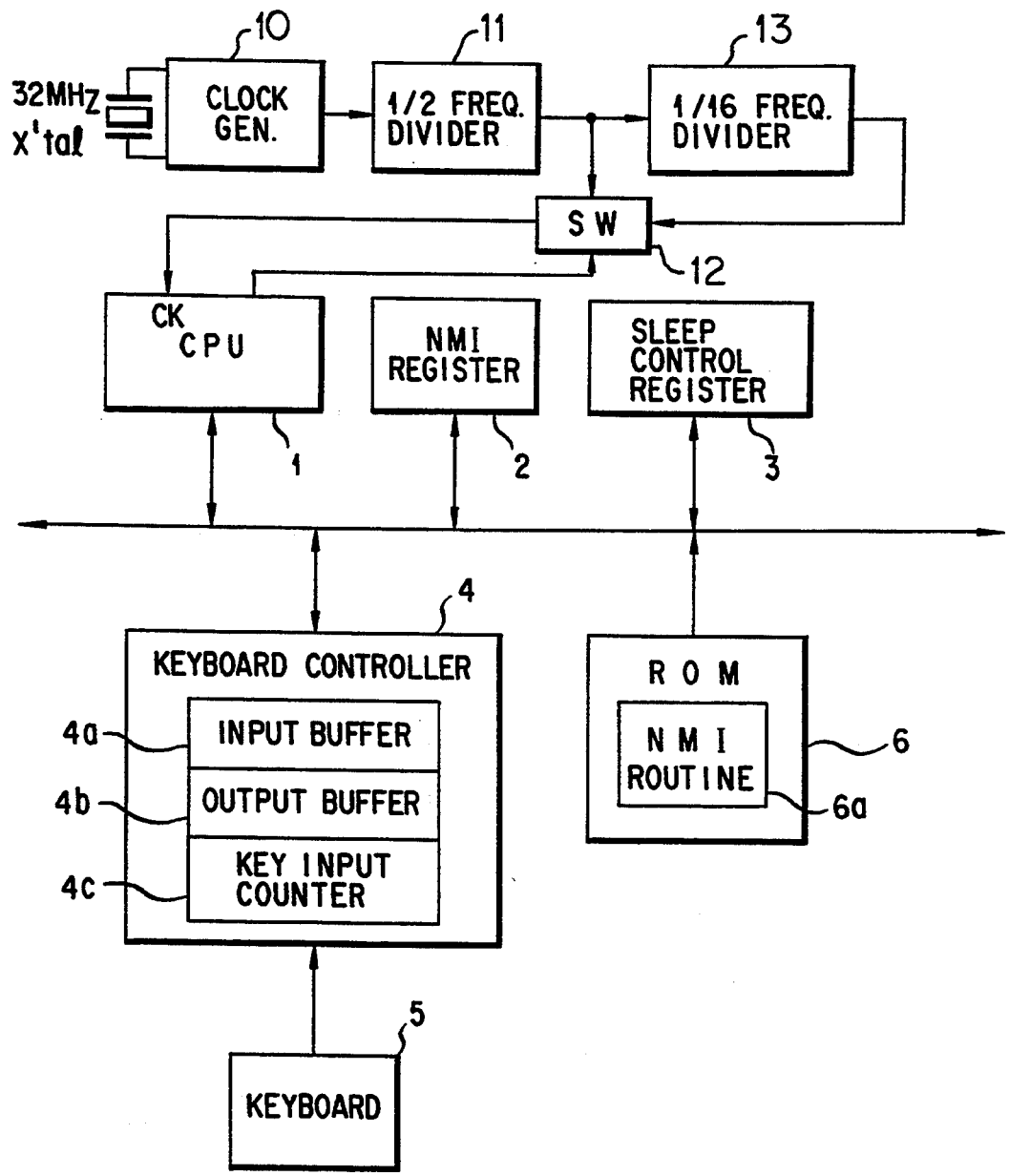
FIG. 1 is a block diagram showing a main part of a computer system according to an embodiment of the present invention.

FIG. 1 is a block diagram showing a main part of a computer system according to the embodiment. The system of this embodiment comprises microprocessor (CPU) 1, NMI register 2, sleep control register 3, keyboard controller 4, keyboard 5, ROM (read-only memory) 6, clock generator 10, ½ frequency divider 11, switch 12, and 1/16 frequency divider 13.

CPU 1 controls the overall system and executes sleep control according to the present invention. When an NMI (Non Maskable Interrupt) request is generated by keyboard controller 4, NMI register 2 sets a flag indicating generation of the request. Sleep control register 3 is a register for setting control information indicating an idle or busy state of CPU 1.

Keyboard controller 4 has a function of checking a key input from keyboard 5 or a command input from CPU 1 at predetermined time intervals, in addition to a normal function of controlling keyboard 5. Keyboard controller 4 includes input buffer 4a for storing a command from CPU 1, output buffer 4b for storing a key code corresponding to a key input, and key input counter 4c.

ROM 6 is a memory having an area 6a for storing an NMI routine associated with the present invention and other various programs. The NMI routine is a program for performing control on the basis of the contents of NMI register 2 and sleep control register 3 to determine whether to set the sleep mode.

CPU 1 has a clock terminal CK to which a clock signal of 16 MHz or a clock signal of 1 MHz is selectively supplied via switch 12 controlled by a switch control signal from CPU 1. The clock signal of 16 MHz is obtained from divider 11 by ½-dividing an output of clock generator 10 and the clock signal of 1 MHz is obtained by 1/16-dividing an output of ½ frequency divider 11 at divider 13.

An operation of the embodiment will be described next.

Figure 2:
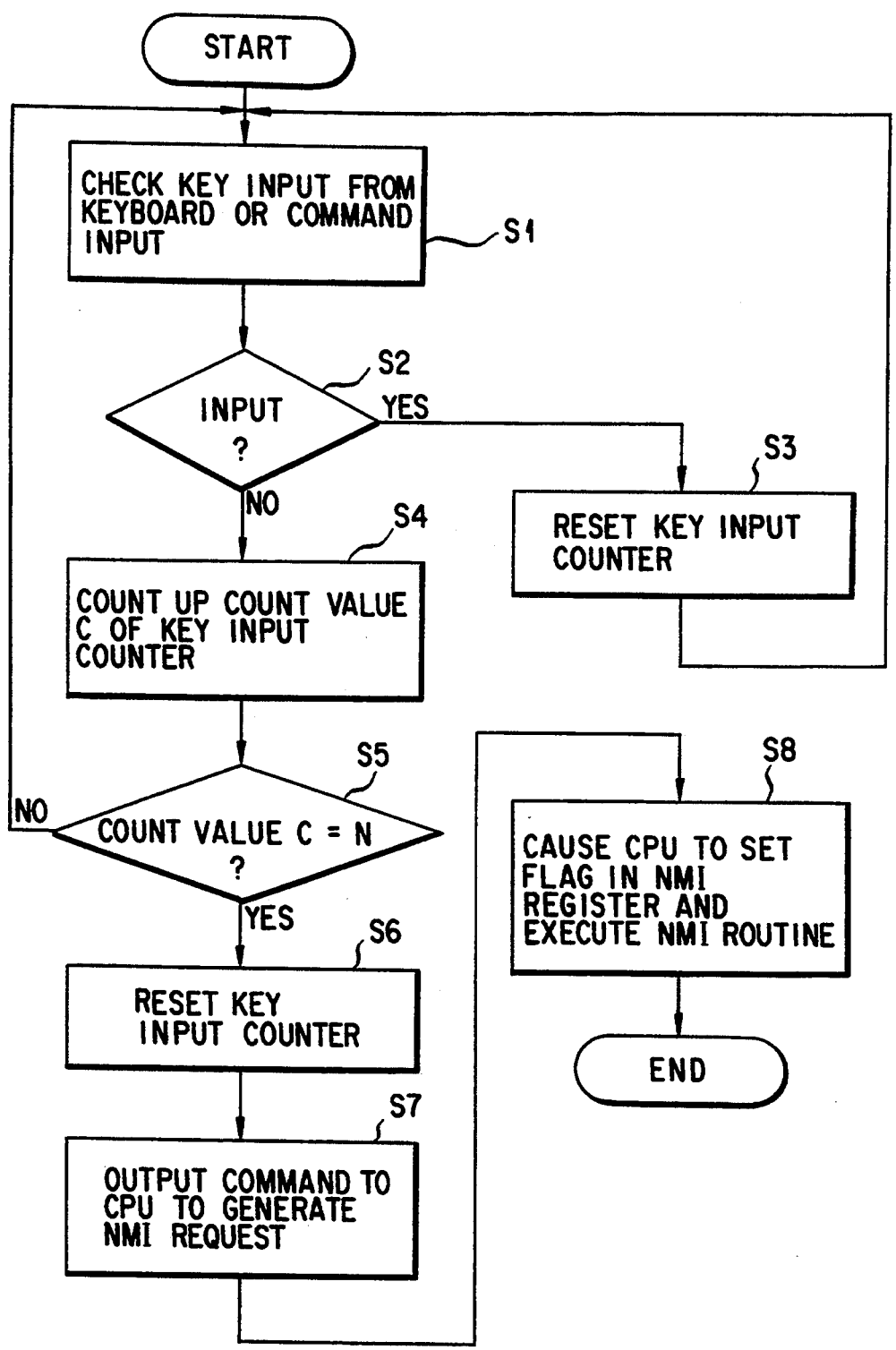
FIG. 2 is a flow chart for explaining an operation of the embodiment.

Keyboard controller 4 checks the presence/absence of a key input from keyboard 5 or a command input from CPU 1 during an operation of the system (step S1 in FIG. 2). More specifically, keyboard controller 4 checks, at predetermined time intervals, whether a key code is stored in output buffer 4b, thereby determining the presence/absence of a key input. In addition, keyboard controller 4 determines the presence/absence of a command from CPU 1 on the basis of the contents of input buffer 4a.

If a key input is made within a predetermined period of time, e.g., within five minutes after the last key input, keyboard controller 4 resets key input counter 4c (YES in step S2, and step S3). At this time, CPU 1 is in a busy state, executing an operation such as execution of an I/O instruction or access to a memory having the clock signal of 16 MHz supplied to the clock terminal CK.

If no key input is made within the predetermined period of time (NO in step S2), keyboard controller 4 counts up or increment count value C of key input counter 4c (step S4). When count value C is counted up to predetermined value N (YES in step S5), keyboard controller 4 resets key input counter 4c (step S6). Keyboard controller 4 also includes input buffer 4a for storing commands from CPU 1 every prescribed interval of time. When no command is supplied from CPU 1, input buffer 4a is reset in the same manner as key input counter 4c. That is, keyboard controller 4 recognizes the absence of a key input or a command input within the predetermined period of time.

Keyboard controller 4 outputs a command to CPU 1 to generate an NMI request (step S7). If CPU 1 is in an idle state, an NMI request is output to request execution of the sleep mode. In accordance with this NMI request, CPU 1 sets a flag in NMI register 2, and executes the NMI routine stored in the area 6a of ROM 6 (step S8).

CPU 1 executes the processing shown in FIG. 3 in accordance with the NMI routine. CPU 1 checks NMI register 2 (step S10). If a flag is set in NMI register 2, CPU 1 checks the contents of sleep control register 3 (YES in step S11, and step S12). Control information indicating whether CPU 1 is in an idle or busy state is set in sleep control register 3. Control information indicating that CPU 1 is in a busy state is set in sleep control register 3 immediately after the power source of the system is turned on/off or when an I/O instruction is executed or access is made to a memory such as a video RAM.

If the contents of sleep control register 3 indicate an idle state (YES in step S13), CPU 1 executes a HALT instruction (step S14). With this operation, CPU 1 stops the execution of the program, output a control signal to switch 12 to supply 1 MHz clock to CPU 1, and is set in the sleep mode. That is, the normal high-speed mode of CPU 1 driven by 16 MHz clock is changed to the low-speed mode using 1 MHz clock to set the power saving mode.

If a key input is made from keyboard 5 in this state, CPU 1 shifts to a busy state (YES in step S15), and resets sleep control register 3 in which the control information indicating the idle state is stored (step S16). Consequently, the sleep mode is canceled, and CPU 1 executes various types of processing in the normal high-speed mode by 16 MHz clock.

According to the present invention, if neither a key input nor a command input from CPU 1 is supplied within a predetermined period of time, keyboard controller 4 generates an NMI request with respect to CPU 1. The NMI request is a hardware interrupt request of the highest priority and a request for sleep control based on the NMI routine. Upon generation of an NMI request, the NMI routine causes CPU 1 to execute a HALT instruction if CPU 1 is in an idle state. With this operation, CPU 1 stops the execution of the program, and is set in the sleep mode.

Even during the execution of an application program, CPU 1 is set in the sleep mode in response to the NMI request of the highest priority. If, therefore, the condition for the sleep mode is satisfied, the sleep mode can be reliably set regardless of the contents of an application program.

As has been described in detail above, when the condition for the sleep mode, i.e., neither a key input nor a command input being supplied within a predetermined period of time, is satisfied, an interrupt request of highest priority for sleep control is generated. Therefore, the sleep mode can be reliably executed regardless of the contents of application software executed in the system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A computer which executes a sleep mode for reducing power consumption of a central processing unit (CPU), comprising:
   data input means for inputting a key code;
   a keyboard controller including determining means for determining whether the key code is input from the data input means at a predetermined time interval, and output means for outputting a request signal to the CPU when the determining means determines an absence of signals including the determination that no key code is input from the data input means within the predetermined time interval;
   a register storing status data discriminating whether the CPU is in an idle state;
   reading means for reading the status in response to the request signal output from the keyboard controller; and
   execution means for executing the sleep mode when the status read by the reading means indicates the CPU is in the idle state.

2. A computer according to claim 1, further comprising means for executing a HALT instruction when the execution means executes the sleep mode.

3. A computer according to claim 2, further comprising means for changing a clock signal supplied to the CPU from a first clock signal to a second clock signal, said second clock signal being slower than the first clock signal, in response to the HALT instruction from the means for executing a HALT instruction.

4. A computer according to claim 1, wherein the data input means includes a keyboard.

5. A computer according to claim 1, wherein the determining means further further comprises means for detecting whether a command is input to the keyboard controller from the CPU at the predetermined time interval, and the output means outputs the request signal when the determining means determines that no key code from the data input means and no command from the CPU is input within the predetermined time interval.

6. A computer which executes a sleep mode for reducing power consumption of a central processing unit (CPU), comprising:
   data input means for inputting a key code;
   a keyboard controller including counting means for counting a time period during which no key code is input from the data input means, the counting means being reset when the key code is input from the data input means or a count value is counted up to predetermined value, the keyboard controller outputting a request signal to the CPU when the count value is counted up to the predetermined value;

a register storing status data discriminating whether the CPU is in an idle state;

reading means for reading the status in response to the request signal output from the keyboard controller; and execution means for executing the sleep mode when the status read by the reading means indicates the CPU is in the idle state.

7. A computer according to claim 6, further comprising means for executing a HALT instruction when the execution means executes the sleep mode.

8. A computer according to claim 7, further comprising means for changing a clock signal supplied to the CPU from a first clock signal to a second clock signal, said second clock signal being slower than the first clock signal, in response to the HALT instruction from the means for executing a HALT instruction.

9. A computer according to claim 6, wherein the data input means includes a keyboard.

10. A computer according to claim 6, further comprising means for resetting the counting means when a command is input to the keyboard controller from the CPU.

11. A computer which executes a sleep mode for reducing power consumption of a central processing unit (CPU), comprising:

data input means for inputting a key code;

a keyboard controller determining an absence of signals including a determination that no key code is input from the data input means at a predetermined time interval, and outputting a request signal to the CPU when the absence of signals is determined by the keyboard controller within the predetermined time interval;

a register storing status data discriminating whether the CPU is in an idle state; and a memory storing an interrupt routine program, the CPU and the interrupt routine program together providing a reading means for reading the status in response to the request signal output from the keyboard controller, and execution means for executing the sleep mode when the status read by the reading means indicates the CPU is in the idle state.

12. A computer according to claim 11, wherein the CPU and the interrupt routine program comprise a means for executing a HALT instruction when the execution means executes the sleep mode.

13. A computer according to claim 12, further comprising means for changing a clock signal supplied to the CPU from a first clock signal to a second clock signal, said second clock signal being slower than the first clock signal, in response to the HALT instruction from the means for executing a HALT instruction.

14. A computer according to claim 11, wherein the data input means includes a keyboard.

15. A computer according to claim 11, wherein the keyboard controller further comprises means for determining whether a command is input to the keyboard controller from the CPU at the predetermined time interval, and for outputting the request signal when no key code from the data input means and no command from the CPU is input within the predetermined time interval.

* * * * *